United States Patent [19]
Goodbary et al.

[11] 3,727,938
[45] Apr. 17, 1973

[54] VEHICLE WHEEL SUSPENSION AND MOUNTING MEANS

[75] Inventors: Edgar R. Goodbary; James E. Thompson, both of Tulsa, Okla.

[73] Assignee: Unit Rig & Equipment Company, Tulsa, Okla.

[22] Filed: July 26, 1971

[21] Appl. No.: 166,275

Related U.S. Application Data

[63] Continuation of Ser. No. 842,467, July 17, 1969, abandoned.

[52] U.S. Cl. ..............................280/96.2, 180/43 B
[51] Int. Cl. ..............................................B60g 3/00
[58] Field of Search ................280/96.1, 96.2, 96.3, 280/64; 267/20, 20 A, 21, 63 R, 63 A; 180/75 F, 43 B

[56] References Cited

UNITED STATES PATENTS

| | | | |
|---|---|---|---|
| 672,713 | 4/1901 | Sanchis | 180/65 F X |
| 866,410 | 9/1907 | Walker | 180/43 B |
| 1,096,947 | 5/1914 | Proskey | 280/96.2 X |
| 1,155,700 | 10/1915 | Bailey | 280/96.2 |
| 1,491,125 | 4/1924 | Zimmerman | 280/96.2 R X |
| 1,892,479 | 12/1932 | Arato | 280/96.3 |
| 2,222,397 | 11/1940 | Broluska | 267/20 X |
| 3,025,079 | 3/1962 | Gouirand | 280/96.2 R X |
| 3,302,739 | 2/1967 | Beck et al. | 180/65 F X |
| 3,398,808 | 8/1968 | Heckenhauer | 280/64 X |

*Primary Examiner*—Philip Goodman
*Attorney*—William S. Dorman

[57] ABSTRACT

A wheel mounting and suspension means for large wheels and vehicles wherein each wheel is independently mounted on the vehicle and independent wheel motors are provided for driving the vehicle wheels. Each vehicle wheel is carried by an independent yoke or support member which is secured between the wheel and vehicle in a manner to provide a universal mounting for each wheel. The wheel is journalled on the yoke member for rotation about a substantially vertical axis during steering of the vehicle, or the like, and the yoke member is pivotally secured to the vehicle for rotation about a substantially horizontal axis to provide compensation for roughness or vertical variation in the terrain over which the vehicle travels. In addition, yieldable shock absorbing means in interposed between the yoke and the vehicle for cushioning or absorbing substantially all the shock due to vertical movements of the wheel during operation of the vehicle.

2 Claims, 5 Drawing Figures

PATENTED APR 17 1973  3,727,938

EDGAR R. GOODBARY
JAMES E. THOMPSON
INVENTORS

BY
William S. Dorman
ATTORNEY

VEHICLE WHEEL SUSPENSION AND MOUNTING MEANS

This application is a continuation in part of my prior application, Ser. No. 842,467 filed July 17, 1969 and entitled "Vehicle Wheel Suspension and Mounting Means" which hereby is abandoned.

This invention relates to improvements in wheel suspension and mounting means and more particularly but not by way of limitation to a mounting and suspension means for securing large wheels independently to a vehicle in a manner providing universal mounting of the wheel and shock absorption during operation of the vehicle.

In vehicles having large wheels, such as off-highway type vehicles wherein the outer diameter of the tires may be as large as 5 feet or even greater, it is common practice to mount each wheel unit independently to the vehicle frame and provide an independent or individual motor for rotation of each wheel. Of course, each wheel must be rotatable about a substantially vertical axis in order that the vehicle may be steered, or the like, and each wheel must be mounted for freedom of vertical movement in order to permit the vehicle to efficiently traverse rough terrain. In addition, it is desirable to cushion or absorb as much shock as possible particularly from vertical movement of the wheels in order to provide as smooth a ride as possible for the vehicle.

The present invention contemplates a novel mounting and suspension means for independently securing large wheels to a vehicle. Each wheel and respective motor is carried by an independent support housing or yoke member. The wheel is journalled on the yoke in a manner for rotation about a substantially vertical axis. The yoke member is pivotally secured to the vehicle for rotation about a substantially horizontal axis whereby the entire wheel is provided vertical freedom of movement during operation of the vehicle. A hanger member is provided on the yoke for engagement with a shaft member secured to the vehicle for supporting yieldable shock absorbing pad members which cooperate with the hanger member for cushioning vertical movements of the wheel from the vehicle itself. The novel wheel mounting and suspension means provides an efficient operation of the wheel and substantially eliminates shock from vertical movements of the wheel being transmitted to the vehicle.

It is an important object of this invention to provide a novel wheel mounting means for large vehicle wheels wherein each wheel is independently universally mounted on the vehicle.

Another object of this invention is to provide a novel wheel mounting means wherein shock resulting from vertical movements of the wheel is absorbed for reducing transmission thereof to the vehicle.

Another object of this invention is to provide a novel wheel mount for large wheels wherein great freedom of movement of the wheel is provided for increasing the efficiency of operation of the vehicle.

Still another object of this invention is to provide a novel wheel mount and suspension device for vehicle wheels which is simple and efficient in operation and economical and durable in construction.

Other and further objects and advantageous features of the present invention will hereinafter more fully appear in connection with a detailed description of the drawings in which.

Figure 1:
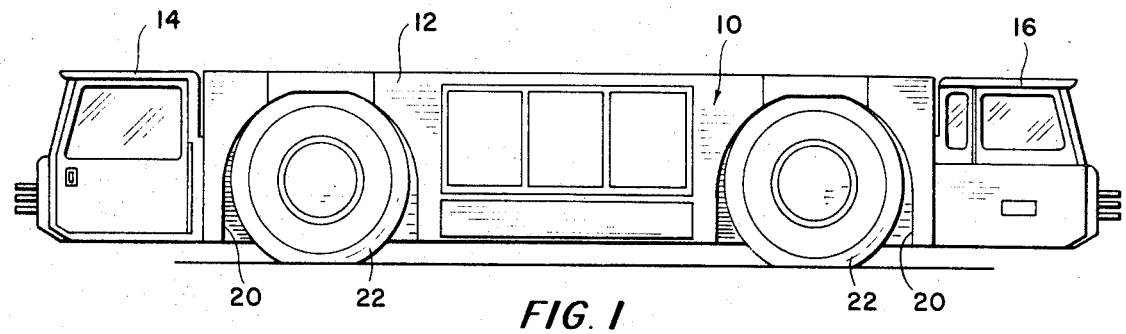
FIG. 1 is a side elevational view of a vehicle of the type with which a wheel mount and suspension device embodying the invention may be utilized.
Figure 2:
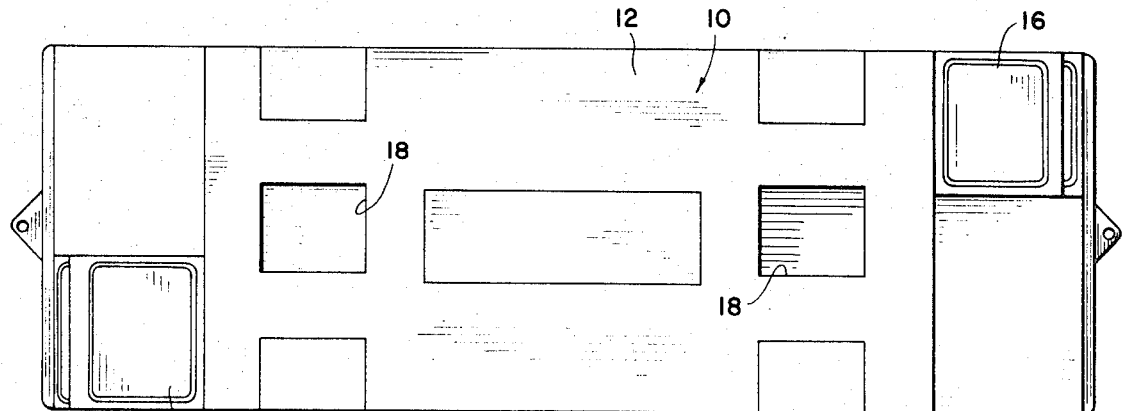
FIG. 2 is a plan view of the vehicle shown in FIG. 1.
Figure 3:
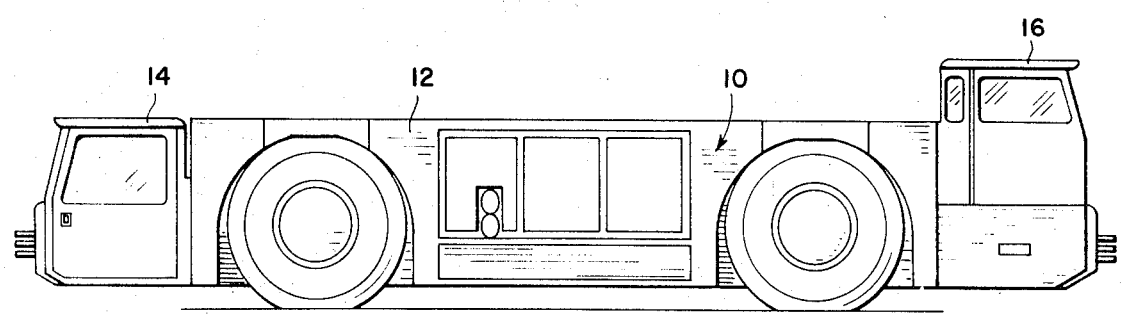
FIG. 3 is a view similar to FIG. 1 depicting the vehicle from the opposite side.

Referring to the drawings in detail, reference character 10 generally indicates a vehicle of the type with which the present invention may be utilized. The vehicle 10 depicted herein is a tow vehicle particularly designed for towing large aircraft and as set forth in copending applications relating thereto. It is to be noted, however, that any suitable vehicle may be provided and there is no intention of limiting the invention to use in combination with this particular vehicle structure.

Figure 4:
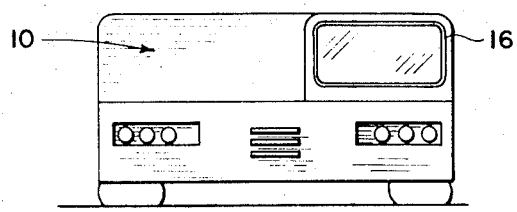
FIG. 4 is a front elevational view of the vehicle shown in FIG. 1.

The vehicle 10 comprises a central body portion 12 of a substantially identical cab sections 14 and 16 provided in the opposite ends thereof whereby the vehicle may be driven from either end or direction thereof with equal ease. As particularly shown in FIG. 4 the cab sections 14 and 16 are preferably positioned to one side of the vehicle to facilitate visibility in the rearward direction with respect to the respective cab and each cab 14 and 16 is provided with all of the necessary steering equipment (not shown), brake control equipment (not shown), operating gages (not shown), shift lever devices (not shown), and the like whereby full control is provided from either cab section independently of the other. A suitable engine or power plant (not shown), engine accessories (not shown), hydraulic tanks (not shown), fuel tanks (not shown), and the like as required for a complete operable vehicle are mounted on the body portion 12. In addition, a plurality of ballast compartments are provided in the body 12 whereby a suitable ballast may be admitted in order that the weight of the vehicle 10 may be increased or decreased in accordance with the operating requirements therefor. Wheel wells 20 are provided in the body portion 12 for housing the vehicle wheels 22 in a manner as will be hereinafter set forth. It is preferable to provide four of the wheel wells 20 and respective wheels 22 with two wheels 22 and wheel wells 20 being provided on one side of the body 12 in longitudinally spaced relation as is well known, and two wheels 22 and wheel wells 20 being provided on the opposite side of the body 12 in substantial alignment with the wheels on the first side. Each wheel 22 is independently mounted within its respective wheel well 20 in a manner providing universal movement for the wheel 22 with respect to the body 12 as will be hereinafter set forth.

Figure 5:
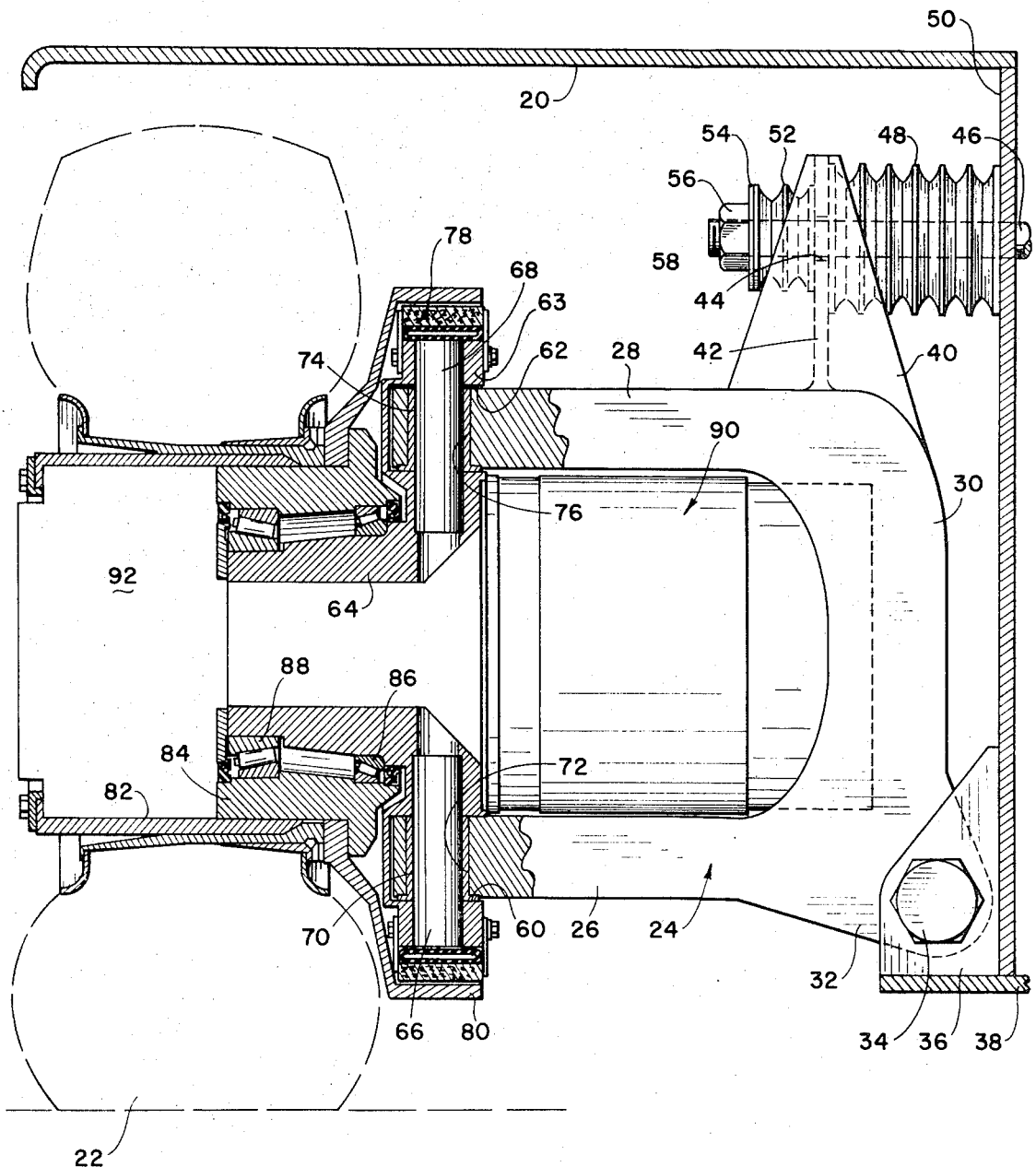
FIG. 5 is an elevational view partly in section of wheel mount and suspension device embodying the invention.

Only one wheel mounting and suspension arrangement is depicted in detail herein, it being understood that all the wheels 22 are secured within the respective wheel well 20 in a substantially identical manner. As particularly shown in FIG. 5 the wheel 22 is carried by a support housing or yoke member generally indicated at 24. The yoke member 24 is substantially U-shaped and is provided with a pair of spaced support arms 26 and 28 connected together at one end by a substantially upright or vertical member 30. The upright member 30 is provided with an apertured projection member 32 for receiving a transversely extending shaft 34 therethrough. The shaft 34 extends between a pair of spaced web or bracket members 36 (only one of which is shown in the drawings) which are welded or otherwise secured to the vehicle frame 38 and within the wheel well 20. The projection member 32 is journalled on the pin or shaft 34 in any suitable manner (not shown) for rotation about the longitudinal axis thereof.

In addition, a pair of spaced upwardly extending flanges or bracket members 40 (only one of which is shown in the drawings) is provided on the support structure 24 spaced from the projection member 32. A plate member 42 is secured between the flanges 40 and is provided with an aperture 44 for loosely receiving a suspension shaft 46 therethrough. The shaft 46 is secured to the vehicle frame 38 in any well known manner (not shown) and extends substantially horizontally outwardly therefrom in a direction toward the wheel 22 and through the aperture 44 and beyond the plate 42. A first set or plurality of heavy duty resilient members or rubber pads 48 are disposed on the shaft 46 and interposed between the plate 42 and the rear wall 50 of the wheel well 20. A second set or plurality of generally similar resilient members or rubber pads 52 are disposed on the shaft 46 and are interposed between the plate 42 and a flange member 54 which is retained on the shaft 46 in spaced relation with respect to the plate 42 by a nut member 56 threadedly secured to the outer end 58 of the shaft 46. It will be readily apparent that movement of the plate 42 in a direction toward the rear wall 50 will be cushioned or substantially absorbed by the resilient members 48 whereas movement of the plate 42 in a direction away from the rear wall 50 will be cushioned by the resilient members 52, as will be hereinafter set forth in detail.

The spaced arms 26 and 28 of the yoke member 24 extend into openings or recesses 60 and 62, respectively, provided in a circumferential flange 63 of a flanged sleeve 64 which extends into the wheel 22 in substantial axial alignment therewith. The sleeve 64 is pivotally secured to the arms 26 and 28 by a pair of axially aligned king pin members 66 and 68. The king pin member 66 extends upwardly through the flange 62 and through a bushing member or journal 70 disposed in an aperture 72 provided in the arm 26. The king pin 68 extends downwardly through the flange 63 and through a bushing or journal 74 disposed in an aperture 76 provided in the arm 28 in substantial alignment with the aperture 72. It will be readily apparent that the flanged sleeve 64 is freely pivotal about the vertical axis defined by the aligned king pins 66 and 68. In addition, the recesses 60 and 62 provided in the flanged sleeve 64 for receiving the arms 26 and 28 are preferably elongated or of a length greater than the width of the respective arm 26 and 28 to assure sufficient clearance therebetween for efficient movement of the sleeve 64 with respect to the yoke 24.

A suitable brake assembly generally indicated at 78 is disposed around the outer periphery of the flange 63 for braking the rotational movement of the wheel 22 during operation of the vehicle 10, as will be hereinafter set forth. The brake assembly 78 is preferably of the expander tube type such as that sold by the B. F. Goodrich Company and shown in their drawing number PD499-225, but is not limited thereto. The brake assembly 78 cooperates with a braking rim member 80 carried by the wheel 22 and upon engagement of the brake 78, the rolling of the wheel 22 will be retarded and braked by the engagement of the brake 78 with the rim 80. The rim 80 is secured to the usual wheel rim 82 and wheel carrier sleeve 84 for movement simultaneously therewith. The carrier sleeve 84 is journalled on the outer periphery of the sleeve 64 in any suitable manner, such as by the bearings 86 and 88 whereby the carrier sleeve 84, rim 82, brake rim 80 and wheel 22 are freely rotatable during travel of the vehicle 10, as is well known.

A suitable wheel motor, generally indicated at 90, is bolted or otherwise secured to the flanges sleeve 64 and is disposed between the arms 26 and 28 of the yoke 24. The drive shaft (not shown) of the motor 90 extends axially through the sleeve 64 into connection with a suitable gear train (not shown) provided in the interior chamber 92 of the wheel rim 82. The motor 90 and gear train arrangement may be of the type disclosed in the Walter I. Meyers co-pending application entitled "Double Planet Gear Drive for Vehicle Wheels," with which I am familiar, but there is no intention of limiting the wheel drive thereto. The motor 90 may be connected with the wheel 22 in any suitable manner for transmitting rotation thereto during operation of the vehicle 10.

When the vehicle 10 is in operation, the wheels 22 thereof are rotated about the axis of the sleeve 64 by means of the wheel motors 90 for moving of the vehicle along a path of travel as is well known in this type of vehicle. The vehicle 10 may be operated completely and independently from either of the cabs 14 or 16 and thus may be driven in either direction as a forward direction. As the wheels 22 are steered by a suitable steering assembly (not shown) the wheels 22 freely rotate about the vertical axis provided by the aligned king pins 66 and 68, thus permitting a great flexibility of steering for the wheels 22. The drive shaft (not shown) of the wheel motor 90 is normally connected with the gear train drive (not shown) of the wheel 22 through a universal connecting member (not shown) whereby the wheel 22 may rotate freely with respect to the motor 90 during the steering of the vehicle 10.

As the wheels 22 roll or ride over uneven terrain, the vertical fluctuations or movements of the wheels causes the yoke member 24 to pivot about the axis of the shaft 34, and thus the vertical movement of the wheels is absorbed by the yoke 24 and is not transmitted to the frame 38. Pivotal movement of the yoke 24 about the shaft 34 causes the plate 42 to reciprocate along the shaft 46, and the cushion members 48 and 52 absorb substantially all of the shock created by the reciprocation of the plate 42 for greatly reducing the transmitting of any sideways movement of the yoke 24 to the frame 38. Thus, the wheels 22 are mounted on the vehicle 10 in a manner providing for universal movement of the wheels with respect to the vehicle 10 and substantially precluding transfer of shock due to the movements of the wheels to the vehicle frame 38.

As hereinbefore set forth the wheels 22 of the vehicle 10 are mounted within the respective wheel well 22 in a substantially identical manner. Each wheel well 20 may be provided with individual shafts 46 either in axial alignment with the shaft 46 of a transversely adjacent wheel well, or out of alignment therewith, or any other arrangement, as desired. In addition, it is to be noted that the tie rod or shock or cushion member mounting shaft 46 of one wheel well 20 may extend through the vehicle frame 38 and into the wheel well 20 of the axially aligned wheel 22. The rod or shaft 46 thus becomes the support shaft for the cushion members 48 and 52 of the pair of transversely aligned wheel supports 24.

From the foregoing it will be apparent that the present invention provides a novel wheel mounting and suspension system for securing the wheels independently to a large vehicle. Each wheel is independently secured to the vehicle in a manner whereby the wheel is freely rotatable about a vertical axis for facilitating steering of the vehicle. In addition, the wheel mounting structure permits vertical fluctuation or movement of the wheel without transfer of the vertical movement to the frame or body of the vehicle. Shock absorbing means is interposed between the wheel mounting structure and the vehicle frame or body for substantially absorbing all shock due to movement of the wheels relative to the vehicle frame or body. The novel wheel mounting and suspension system is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. In combination with a vehicle having wheels, a wheel mounting assembly comprising a support housing interposed between the vehicle and one wheel for independently securing the wheel to the vehicle with respect to the other wheels, a substantially horizontally extending pivot shaft secured to the vehicle, the bottom portion of the said support means being journalled on the pivot shaft for pivoting about the longitudinal axis thereof, the said support housing comprising a U-shaped yoke member having a pair of spaced arm members extending outwardly from the vehicle toward the wheel for receiving a portion of the wheel therebetween, a flanged sleeve member having a longitudinal drive shaft aperture therethrough disposed between the spaced arm members and extending outwardly therefrom, the said wheel being journalled on the said sleeve member, king pin means provided for securing the sleeve member to the support housing whereby the wheel is freely rotatable about a vertical axis defined by the king pin means, said king pin means comprising a pair of spaced axial aligned pin members journalled between the arms and the sleeve on either side of the sleeve drive shaft aperture to provide said vertical axis of rotation for the wheel, braking means interposed between the king pin means and the wheel for braking of the wheel, cushioning means yieldably secured between the vehicle and the upper portion of the support housing for absorbing the pivotal movement of the housing about the pivot shaft, and an independent wheel motor disposed between said pair of spaced arms and operably connected to the wheel for driving the said wheel, the said motor being secured to the flanged sleeve.

2. A wheel mounting assembly as set forth in claim 1 wherein the cushioning means comprises a shaft member rigidly secured to the vehicle and extending outwardly therefrom in a direction toward the wheel, aperture plate means carried by the support housing and reciprocally disposed on the rigid shaft, a first set of heavy duty resilient pad members disposed on the rigid shaft between the plate means and the vehicle for maintaining substantially vertical position of the wheel with respect to the vehicle and for absorbing the heavy shock of a wheel hitting a bump, a second set of lighter duty pad members disposed on the shaft opposite from the first set of pad members with respect to the plate means, and flange means secured to the shaft for retaining the second of pad members thereon whereby the first and second sets of pad members cooperate with the plate means for absorbing shock from the pivotal movement of the support housing in opposite directions about the pivot shaft.

* * * * *